United States Patent
Annenkov et al.

[11] Patent Number: 5,810,962
[45] Date of Patent: Sep. 22, 1998

[54] APPARATUS AND PROCESS FOR REMOVING COMPUTER DISKETTE LABELS

[75] Inventors: Oleg K. Annenkov, Houston; Mark T. Riegert, Seabrook, both of Tex.

[73] Assignee: Magnatech Computer Services, Inc., Houston, Tex.

[21] Appl. No.: 720,508

[22] Filed: Sep. 30, 1996

[51] Int. Cl.⁶ ............................................. B32B 35/00
[52] U.S. Cl. ...................... 156/344; 156/584; 29/426.3
[58] Field of Search ........................ 156/94, 344, 573, 156/584; 29/426.3, 426.4, 426.5

[56] References Cited

U.S. PATENT DOCUMENTS

| | | | |
|---|---|---|---|
| 4,285,759 | 8/1981 | Allen et al. | 156/584 |
| 4,421,586 | 12/1983 | Bargman | 156/247 |
| 4,443,287 | 4/1984 | Worni | 156/344 X |
| 4,465,538 | 8/1984 | Schmoock | 156/241 X |
| 4,508,589 | 4/1985 | Tarui et al. | 156/584 |
| 4,631,103 | 12/1986 | Ametani | 156/241 |
| 4,631,110 | 12/1986 | Tsumura et al. | 156/584 |
| 4,732,642 | 3/1988 | Ametani | 156/497 |
| 4,775,438 | 10/1988 | Funakoshi et al. | 156/344 X |
| 4,861,411 | 8/1989 | Tezuka | 156/344 |
| 4,973,088 | 11/1990 | Levy | 283/81 |
| 5,006,190 | 4/1991 | Earle | 156/247 |
| 5,009,735 | 4/1991 | Ametani et al. | 156/241 |
| 5,254,201 | 10/1993 | Konda et al. | 156/344 |
| 5,378,300 | 1/1995 | Huvard et al. | 156/344 |
| 5,466,325 | 11/1995 | Mizuno et al. | 156/344 |
| 5,492,590 | 2/1996 | Sakai | 156/344 |
| 5,607,539 | 3/1997 | Kuppersbusch | 156/573 X |
| 5,651,846 | 7/1997 | Hurst | 156/344 X |
| 5,665,445 | 9/1997 | Carney, Jr. | 428/40.1 |

*Primary Examiner*—Mark A. Osele
*Attorney, Agent, or Firm*—Fulbright & Jaworski, LLP

[57] ABSTRACT

An apparatus and method for removing adhesive labels from thin articles, such as computer diskettes, is provided. The apparatus includes a diskette hopper for sequentially feeding a plurality of labeled diskettes onto an adhesive surface of a length of tape. The length of tape is fed from a tape supply reel and stretchers across the apparatus to a tape take up reel where the used tape and removed labels are wound up for disposal. A motor is attached to the take up reel for driving the diskette from an attachment area, where the tape is adhered to the diskette adhesive label, to a separation area where the diskette label is peeled from the diskette. The apparatus may further include radiant heaters for applying heat to the length of tape and the diskette labels to ease the label removal process.

30 Claims, 10 Drawing Sheets

APPARATUS AND PROCESS FOR REMOVING COMPUTER DISKETTE LABELS

BACKGROUND OF THE INVENTION

1. Field of the Invention

The present invention relates to an apparatus and process for removing adhesive labels from at least one side of a thin article, and more particularly to an apparatus and process for removing adhesive labels from at least a front surface of computer diskettes.

2. Description of the Related Technology

There is a growing need for recycling of used computer diskettes. Recycling of diskettes can be accomplished by erasing the data on the diskette and removing the diskette label, which prepares the diskette to receive a new label and to be programmed with new data. The data on these diskettes can be erased simply by passing the diskette through a magnetic field. Removal of the adhesive label has proven to be somewhat more difficult. The labels are prone to tearing when attempts are made to peel them from the diskettes. Solvents have been applied to the label to soften the adhesive, allowing it to more easily be removed. However, the use of solvents can contaminate the internal data disk of the diskette, rendering it useless.

Accordingly, there is a need for a process and apparatus for removing computer diskette labels in one piece without tearing the label or using solvents to soften the label.

SUMMARY OF THE INVENTION

An object of the present invention is to provide an apparatus for removing computer diskette labels without the use of solvents, which can ruin the diskette, to break up the adhesive.

A further object of the invention is to provide a process for removing computer diskette labels from computer diskettes which quickly and completely removes the labels without the use of a solvent.

Still another object of the invention is to provide an apparatus and method for removing labels from computer diskettes that is capable of processing a high volume of diskettes quickly and effectively.

Thus in accomplishing the foregoing objects, there is provided in accordance with one aspect of the present invention an apparatus for removing adhesive labels from computer diskettes comprising diskette supply means for feeding a diskette having an adhesive label adhered to at least one side thereof, label removal means for peeling said adhesive label from the diskette, diskette motive means for driving the diskette from an attachment area where said label removal means is adhered to the diskette adhesive label to a separation area where said diskette label is peeled from the diskette by said label removal means, and guide means for guiding said diskette and said label removal means from said attachment area to said separation area.

The diskette supply means according to one aspect of the invention comprises a supply hopper for storing a plurality of diskettes, and a hopper feed motor for sequentially feeding the diskettes from the supply hopper to the label removal means.

The label removal means according to one aspect of the invention may comprise a length of tape having an adhesive coating on an underside thereof, a tape supply reel about which the length of tape is wound, pressure means for applying a portion of the underside of the length of tape from the supply reel to the diskette adhesive label at the attachment area, label peeling means for separating the diskette adhesive label carried on the underside of the length of tape from the diskette at the separation area, and a tape take up reel for receiving the length of tape and the removed adhesive diskette labels. The pressure means may comprise a first rotatable pressure roller contacting an upper surface of the length of tape for urging the length of tape into adhesive contact with the diskette label. The label peeling means may comprise a second rotatable pressure roller contacting an upper surface of the length of tape at a point near the separation area, and a stripping roller also contacting an upper surface of the length of tape at the separation area. The length of tape wraps around at least a portion of the stripping roller and connects to the take up roll located above the stripping roller.

Tension means may also be provided for applying a predetermined pressure to the length of tape by the second rotatable pressure roller and the stripping roller. The tension means may comprise a tension bar pivotally connected near a midpoint thereof to a frame of the apparatus for removing adhesive labels, a lower end of said tension bar connected to both said second rotatable pressure roller and said stripping roller, and a tension spring having a first end connected to an upper end of said tension bar and a second end connected to a fixed object.

The label peeling means according to a further aspect of the invention may also comprise means for retaining the diskette within the guide means in the area of separation as the label is stripped from the surface of the diskette by the length of tape and stripping roller.

According to an alternative embodiment of the invention, the label peeling means may further include a wraparound label removal means for removing the diskette label from a spine and a back side of the diskette. The wraparound label removal means may, according to one aspect, comprise a spring-loaded break mechanism for holding a forward end of the diskette to the guide track as the rear end of the diskette passes under the stripping roller, a label spine and back removal mechanism comprising a shaft disposed along the upper surface of the length of tape between the stripping roller and the take up roll, and a stop located adjacent to the shaft for holding the diskette in place as the label is removed from the spine and back of the diskette. A disk track may also be provided for receiving the unlabeled diskette from the label spine and back removal mechanism and discharging the unlabeled diskette from the apparatus. Air cooling means may be further provided for cooling the adhesive label attached to the spine and back of the diskette as the diskette and label are carried from the stripping roller to the label spine and back removal mechanism.

The diskette motive means according to one aspect of the invention comprises a motor for rotatably driving the take up reel such that the length of tape drives the diskette from the attachment area to the separation area and the length of tape carrying the removed diskette adhesive label is wound about the take up reel. A gear belt may be provided for connecting the drive motor to and providing rotary motion to the take up reel.

The guide means may comprise a track for slidably receiving a plurality of diskettes therein. The track may exhibit a first end for receiving diskettes from the diskette supply means and a second end wherein diskettes are discharged after the labels are removed. The track may exhibit guide walls along the lateral sides thereof for guiding the diskettes within the track.

Heating means may be provided for applying heat to the length of tape and diskette label between said attachment area and said separation area. According to one aspect of the invention, the heating means is an electric radiant heater located a predetermined distance above the length of tape between the attachment area and the separation area.

A further aspect of the present invention is a process for removing adhesive labels from computer diskettes comprising the steps of sequentially supplying a plurality of diskettes, each having an adhesive label adhered to at least one side thereof, to a diskette guide track; applying a length of tape received from a tape supply reel to the diskette label at an attachment area along the diskette guide track; moving the diskette, diskette label and length of tape along the guide track by motive power means attached to the length of tape; peeling the diskette label from the diskette at a separation area along the guide track, such that said diskette label remains attached to the length of tape; wrapping the length of tape carrying the removed diskette labels about a take up reel; and discharging a non-labeled diskette from the guide track.

The process may further include the step of applying heat to the length of tape and the diskette labels after the step of applying a length of tape to the diskette label.

According to an alternative embodiment, the step of peeling the diskette label from the diskette may further comprise removing the diskette label from a spine and a back of the diskette. This may be accomplished by holding a forward end of the diskette to the guide track as the rear end of the diskette passes under the stripping roller; carrying the diskette and label by the spine from the stripping roller to a label spine and back removal mechanism; and holding the diskette in place while the label is removed from the spine and back of the diskette. The label attached to the spine and back of the diskette as the diskette and label are carried from the stripping roller to the label spine and back removal mechanism may be subjected to air cooling.

Other and further objects, features and advantages will be apparent and eventually more readily understood from a reading of the following specification and accompanying drawings, wherein examples of the presently preferred embodiments of the invention are given for the purpose of disclosure.

DESCRIPTION OF THE PREFERRED EMBODIMENTS

As shown in FIGS. 1–4, an apparatus for removing computer diskette labels 10, according to one aspect of the invention, comprises a diskette supply means for sequentially feeding a plurality of diskettes 100, each having an adhesive label 102 adhered to at least one side thereof, a label removal means for peeling the adhesive label 102 from the diskette 100, a diskette motive means for driving the diskette 100 from an attachment area 12 where the label removal means is adhered to the diskette adhesive label 102 to a separation area 14 where the diskette label 102 is peeled from the diskette 100 by the label removal means, and a guide means for guiding the diskette 100 and the label removal means from the attachment area 12 to the separation area 14.

The diskette supply means may include a supply hopper 16 for storing a plurality of diskettes 100, and a hopper feed motor 18 for sequentially feeding the plurality of diskettes 100 to the guide means. The guide means may comprise a diskette guide track 20 for slidably receiving said plurality of diskettes 100. The guide track 20 preferably exhibits a first end for receiving diskettes from the supply hopper 16 and a second end from which diskettes 100 are discharged after the labels 102 are removed. The guide track 20 serves as a guide means for guiding the diskettes from the attachment area 12 to the separation area 14 and beyond. The guide track 20 may also exhibit guide walls 20a, 20b along the lateral sides thereof for guiding the diskettes within the track. The first end of the guide track may be located at a point higher than the second end of the guide track, thereby allowing gravity to assist in moving the diskettes along the guide track before the diskette enters the attachment area and after the diskette leaves the separation area. The guide track may preferably be formed of a plastic material having a low coefficient of friction to permit the diskettes to slide along the track.

The label removal means according to one aspect of the invention may comprise a length of tape 22, having an adhesive coating on an underside thereof, wound about a tape supply reel 24. The tape supply reel 24 is mounted on substantially upright support arms 26, which extend upwardly from the surface of the guide track 20. The tape 22 from the supply reel 24 is passed from the supply reel about a first rotatable pressure roller 28, which is also connected to the support arms 26 and is mounted above the guide track 20 such that the pressure roller 28 carrying the tape 22, contacts the upper surface of a diskette 100 as the diskette passes through the attachment area 12. The pressure roller 28 applies a portion of the length of tape 22 from the supply reel 24 to the diskette adhesive label 102 at the attachment area 12.

Figure 4:
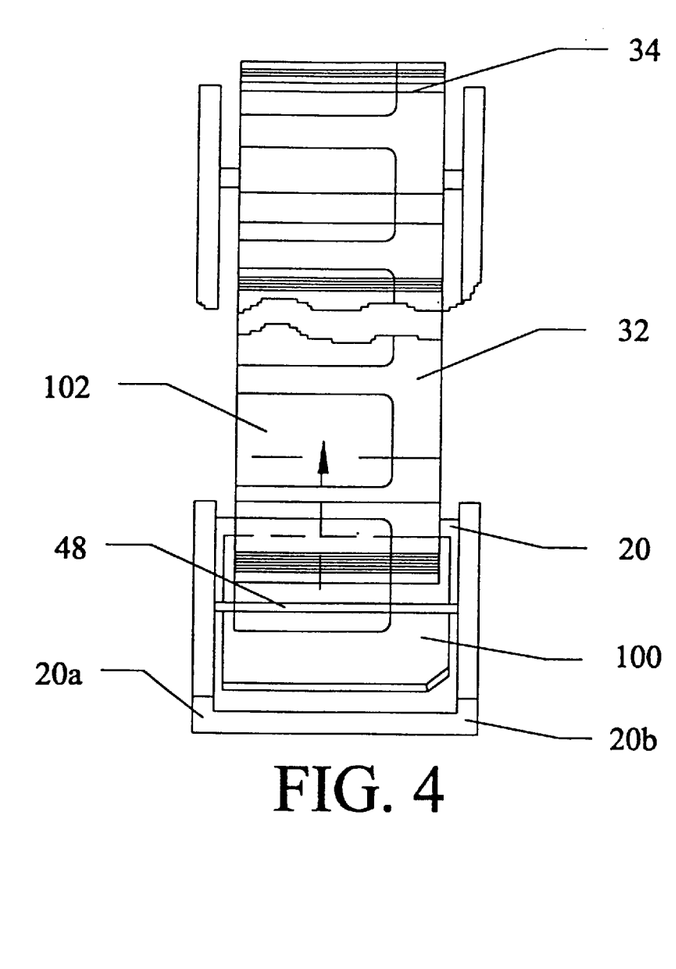
FIG. 4 is an end view of the apparatus of FIG. 1, shown from the right end thereof.

The diskette is then carried along the track 20 by the tape 22 to the separation area where the tape passes under a second pressure roller 30 and a stripping roller 32. The stripping roller 32 separates the length of tape 22 carrying the diskette adhesive label 102 from the diskette 100 at the separation area, as best shown in FIG. 4. A tape take up reel 34 is provided for receiving the length of tape 22 carrying the removed adhesive diskette labels 102. The tape take up reel 34 is mounted on substantially upright support arms 36, which extend upwardly from the surface of the guide track 20. Diagonal support braces 38 may also be included to provide additional support.

Figure 1:
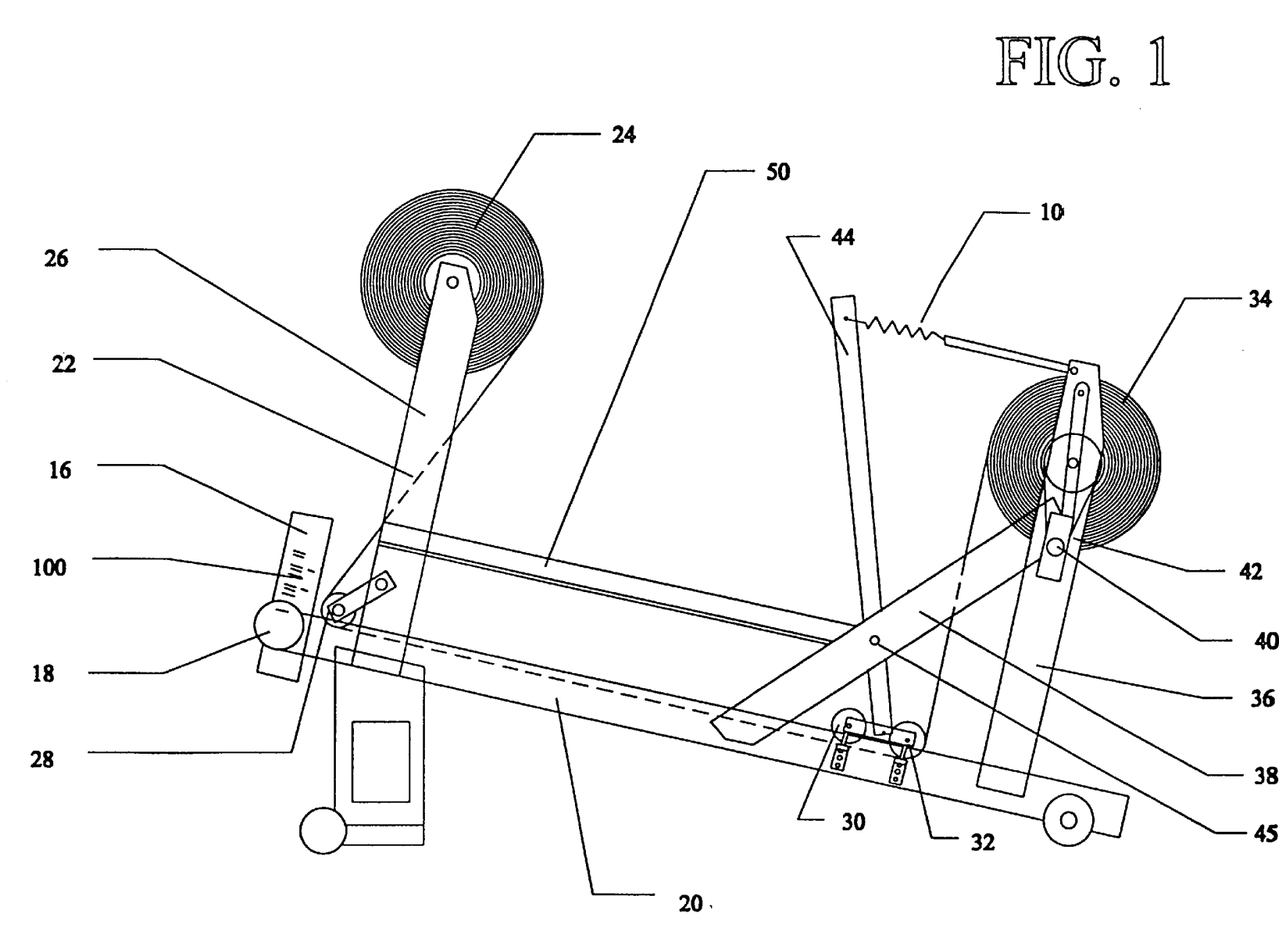
FIG. 1 is a side view in elevation of an apparatus for removing labels from computer diskettes according to one embodiment of the present invention.
Figure 2:
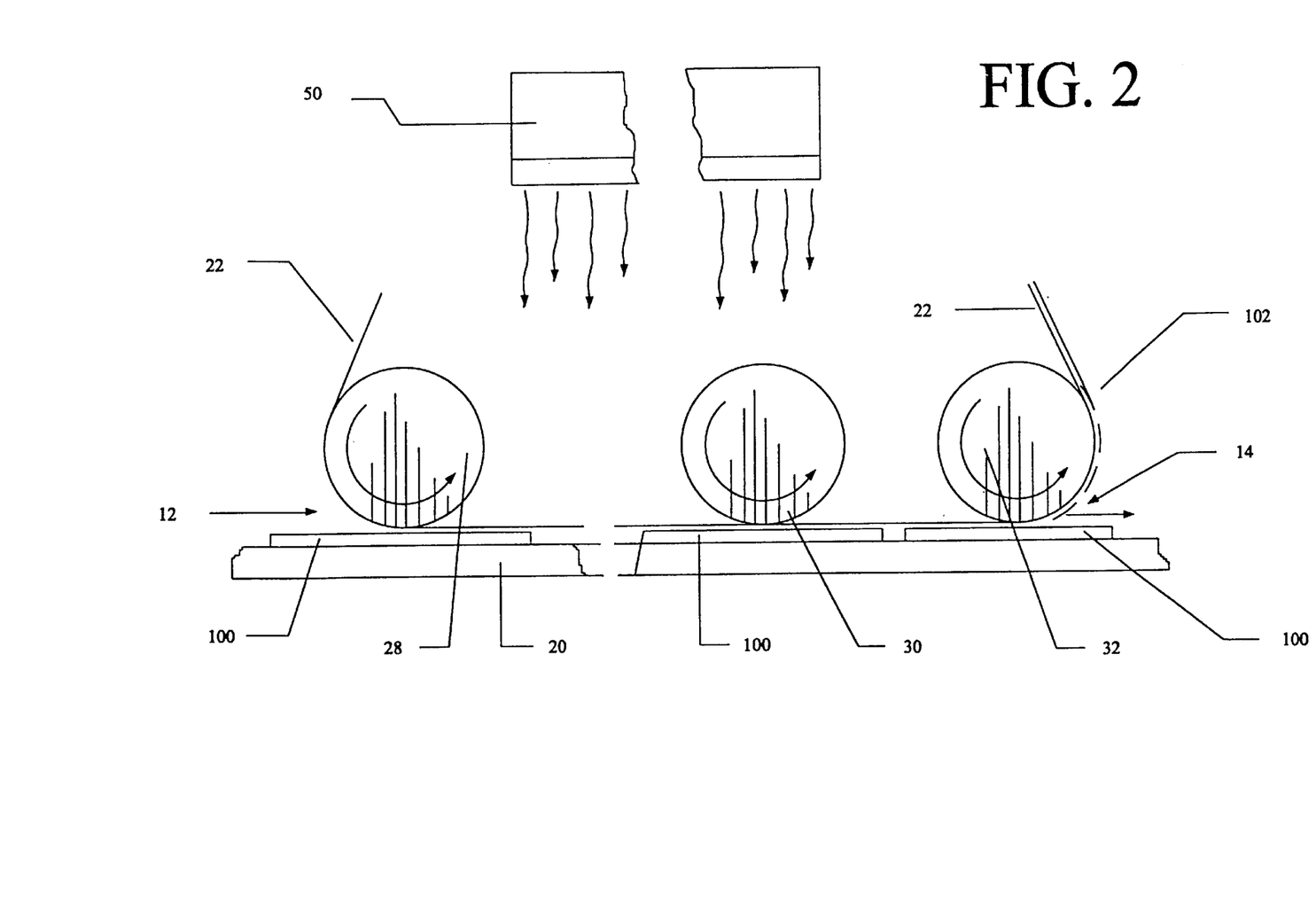
FIG. 2 is an enlarged sectional view of selected portions of the apparatus of FIG. 1, shown with the supporting structure removed for clarity.
Figure 3:
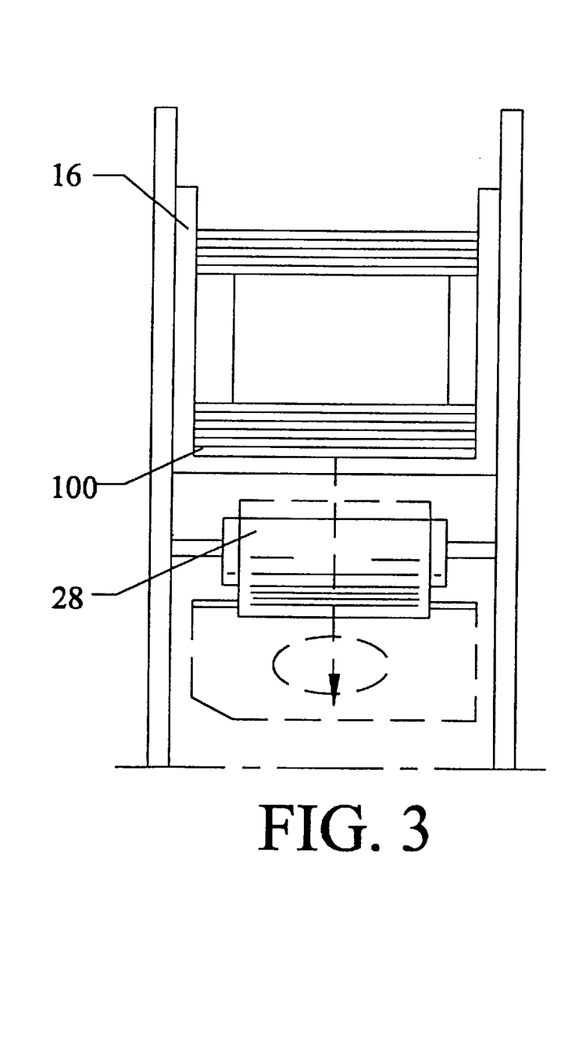
FIG. 3 is an end view of the apparatus of FIG. 1, shown from the left end thereof.

According to one embodiment of the invention, the diskette motive means comprises a motor 40 for rotatably driving the take up reel 34 such that the length of tape 22 drives the diskette 100 from the attachment area 12 to the separation area 14. The length of tape 22 carrying the removed diskette adhesive labels 102 is wound about the take up reel 34. Any suitable drive connection, such as drive belt 42, may be used to connect the motor 40 to the take up reel 34.

The tension means for applying a predetermined pressure to the length of tape by the second rotatable pressure roller and the stripping roller may include a tension bar 44 pivotally connected near a midpoint thereof to the frame of the apparatus on the diagonal braces 38. A lower end of the tension bar 44 may be connected to both the second rotatable pressure roller 30 and the stripping roller 32. A tension spring 46 having a first end connected to an upper end of the tension bar 44 and a second end connected to a fixed object, such as an upper end of the upright support arms 36 may also be provided. The tension spring 46 applies a torque to the tension bar 44 about the pivot point 45, thereby applying a downward force at the lower end of the tension bar 44, by the second pressure roller 30 and the stripping roller 32.

A diskette retaining shaft 48 is provided above the guide track 20 for retaining the diskette 100 within the guide track 20 as the diskette passes through and beyond the area of separation 14.

The apparatus may further include heating means 50 for applying heat to the length of tape 22 and diskette label 102 between said attachment area 12 and said separation area 14. According to one embodiment, the heating means 50 comprises an electric radiant heater located a predetermined distance above the length of tape 22 between the attachment area 12 and the separation area 14.

Figure 5:
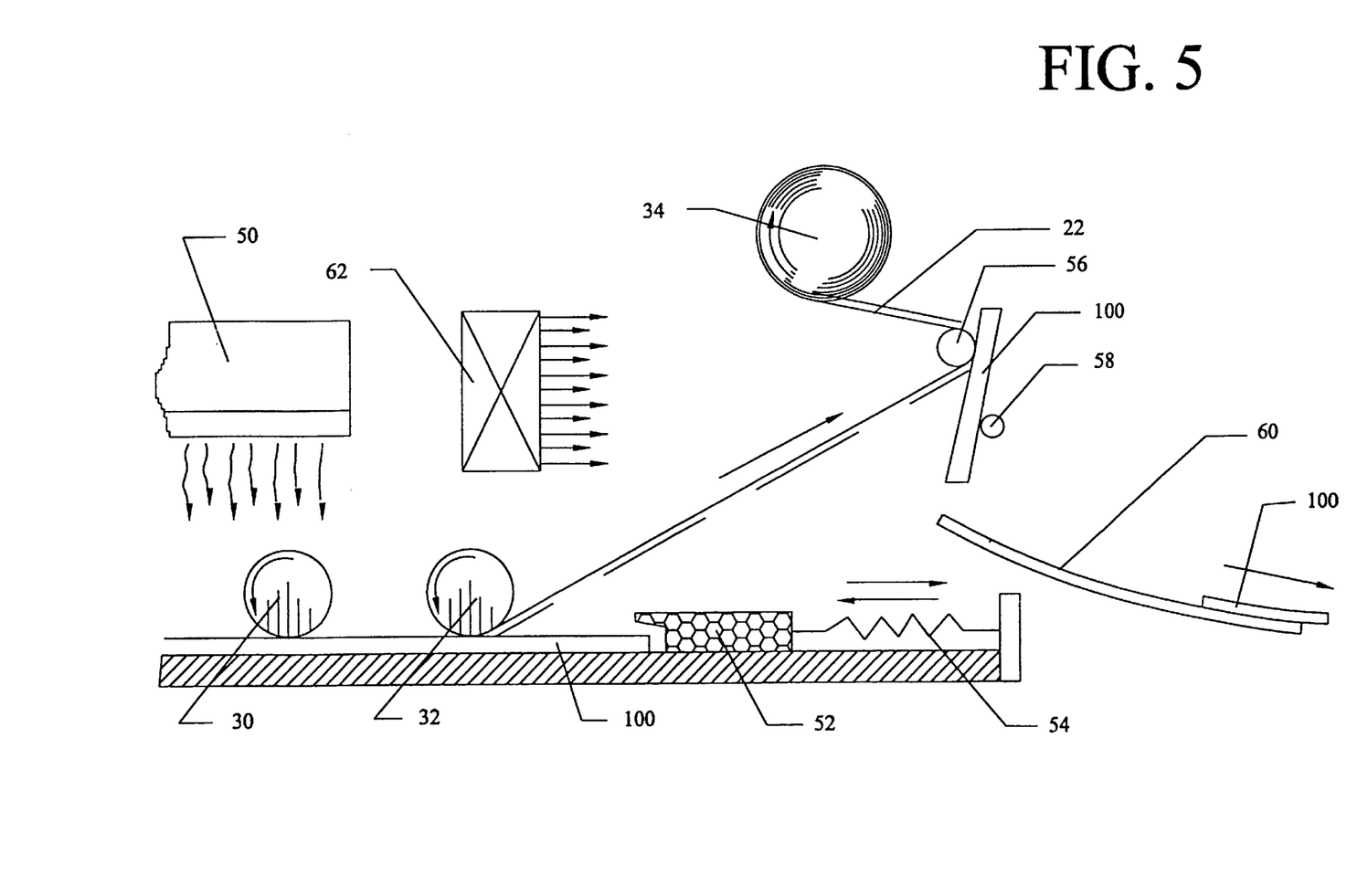
FIG. 5 is a sectional side view in elevation of an apparatus for removing labels from computer diskettes according to an alternative embodiment of the present invention.
Figure 6A:
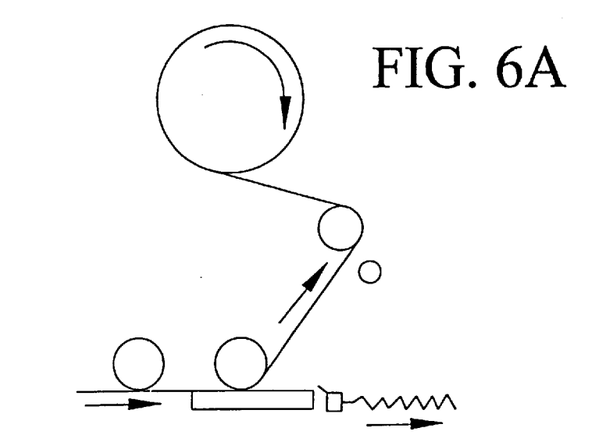
FIGS. 6A–6D show the sequential steps for removing a label from the spine and back of a diskette using the apparatus of FIG. 5.
Figure 6B:
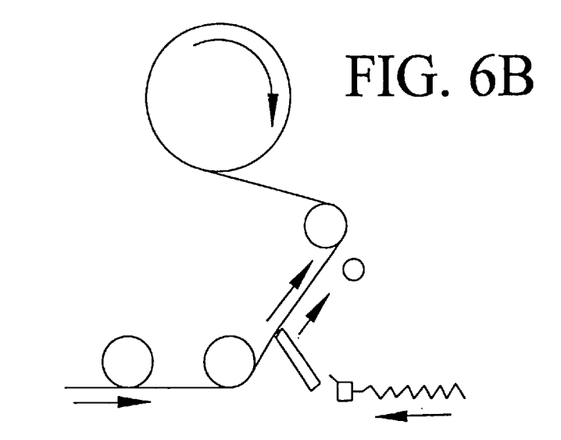
Figure 6C:
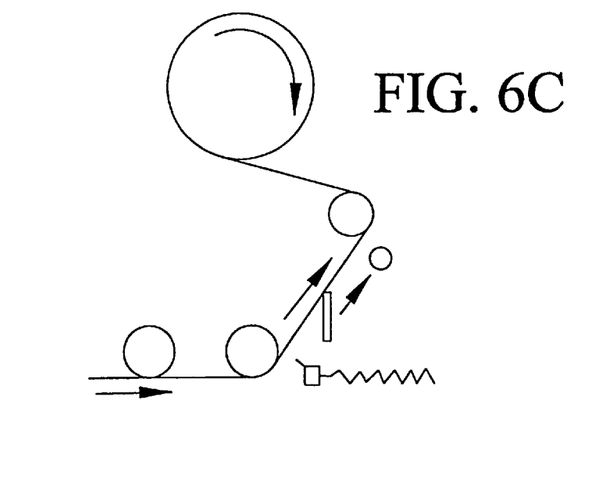
Figure 6D:
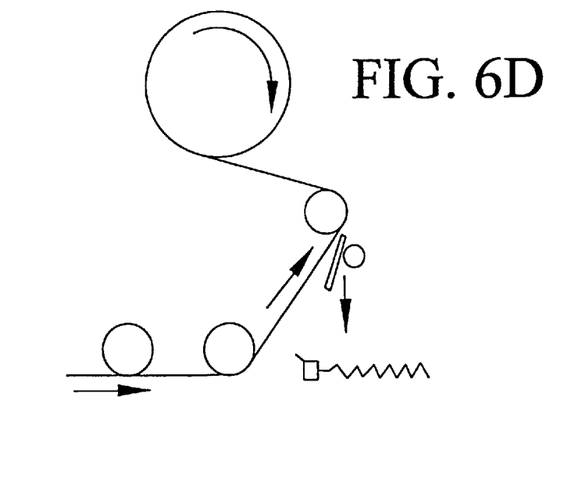

According to a further aspect of the invention, the label peeling means further comprises wraparound label removal means, as shown in FIG. 5, for removing the diskette label from a spine and a back side of the diskette. The wraparound label removal means may include a break mechanism 52 connected to a spring 54 for holding a forward end of the diskette 100 to the guide track 20 as the rear end of the diskette passes under the stripping roller 32. A label spine and back removal mechanism comprising a shaft 56 disposed along the upper surface of the length of tape 22 between the stripping roller 32 and the take up roll 34, and a stop 58 located adjacent to the shaft for holding the diskette in place as the label 102 is removed from the spine and back of the diskette. A disk track 60 may be provided for receiving the unlabeled diskette 100 from the label spine and back removal mechanism and discharging the unlabeled diskette from the apparatus. A cool air fan 62 may be provided to cool the adhesive label 102 attached to the spine and back of the diskette 100 as the diskette and label are carried from the stripping roller 32 to the label spine and back removal mechanism.

A process for removing adhesive labels from computer diskettes is also disclosed in the present invention. According to one embodiment of the invention, the process comprises the steps of: sequentially supplying a plurality of diskettes 100, each having an adhesive label 102 adhered to at least one side thereof, to a diskette guide track 20; applying a length of tape 22 received from a tape supply reel 24 to the diskette label 102 at an attachment area 12 along the diskette guide track 20; moving the diskette, diskette label and length of tape along the guide track by motive power means attached to the length of tape; peeling the diskette label 102 from the diskette at a separation area 14 along the guide track, such that said diskette label remains attached to the length of tape; wrapping the length of tape carrying the removed diskette labels about a take up reel 34; and discharging a non-labeled diskette from the guide track. The process may further include the step of applying heat to the length of tape 22 and the diskette labels 102 after the step of applying a length of tape to the diskette label.

According to one aspect of the process, diskettes 100 are sequentially fed from the supply hopper 16 by hopper feed motor 18 to a guide track 20. Once a diskette enters the guide track, gravity carries the diskette along the track to an attachment area 12, where tape 22 is applied to the diskette label 102 by a first pressure roller 28. The tape 22 and diskette 100 are driven along the guide track by a motor 40 connected to the tape take up reel 34 to a separation area 14. At the separation area, a second pressure roller 30 and a stripping roller 32 peel the label 102 from the upper surface of the diskette 100. The unlabeled diskette then travels the remaining distance down the guide track for further sorting and/or processing. The removed labels 102 are wrapped about the take up reel 34 with the tape 22. Once the take up reel is filled, the tape and labels may be discarded.

According to a further embodiment of the invention, the process may further comprise removing the diskette label 102 from a spine and a back of the diskette 100. This step may comprise the steps of: holding a forward end of the diskette 100 to the guide track 20 as the rear end of the diskette passes under the stripping roller 32; carrying the diskette 100 and label 102 by the spine from the stripping roller to a label spine and back removal mechanism; and holding the diskette in place while the label is removed from the spine and back of the diskette. The step of removing the diskette label from the spine and back of the diskette further comprises the step of air cooling the label attached to the spine and back of the diskette as the diskette and label are carried from the stripping roller to the label spine and back removal mechanism.

As shown in FIGS. 5 and 6A–6D, the diskette label 102 is removed from the spine and back of the diskette 100, by engaging the leading edge of the diskette with a break mechanism 52, which is connected to a spring 54. The spring is compressed as the diskette moves along the guide track, while the breaking mechanism 52, holds the leading edge of the diskette on the guide track 20. As the trailing edge of the diskette passes under the stripping roller 32 and the label is peeled from the upper surface of the diskette, the diskette 100 is carried by the spine portion of the label 102, which is attached to the tape 22, upward toward the label spine and back removal mechanism. When the upper surface of the diskette comes into contact with the stop 58, and the spine and back of the diskette come into contact with the shaft 56, the label is peeled from the spine and back of the diskette. The diskette is then dropped into the diskette guide track 60, where it may then travel for further sorting and/or processing. The removed labels 102 are wrapped about the take up reel 34 with the tape 22. Once the take up reel is filled, the tape and labels may be discarded.

Figure 7:
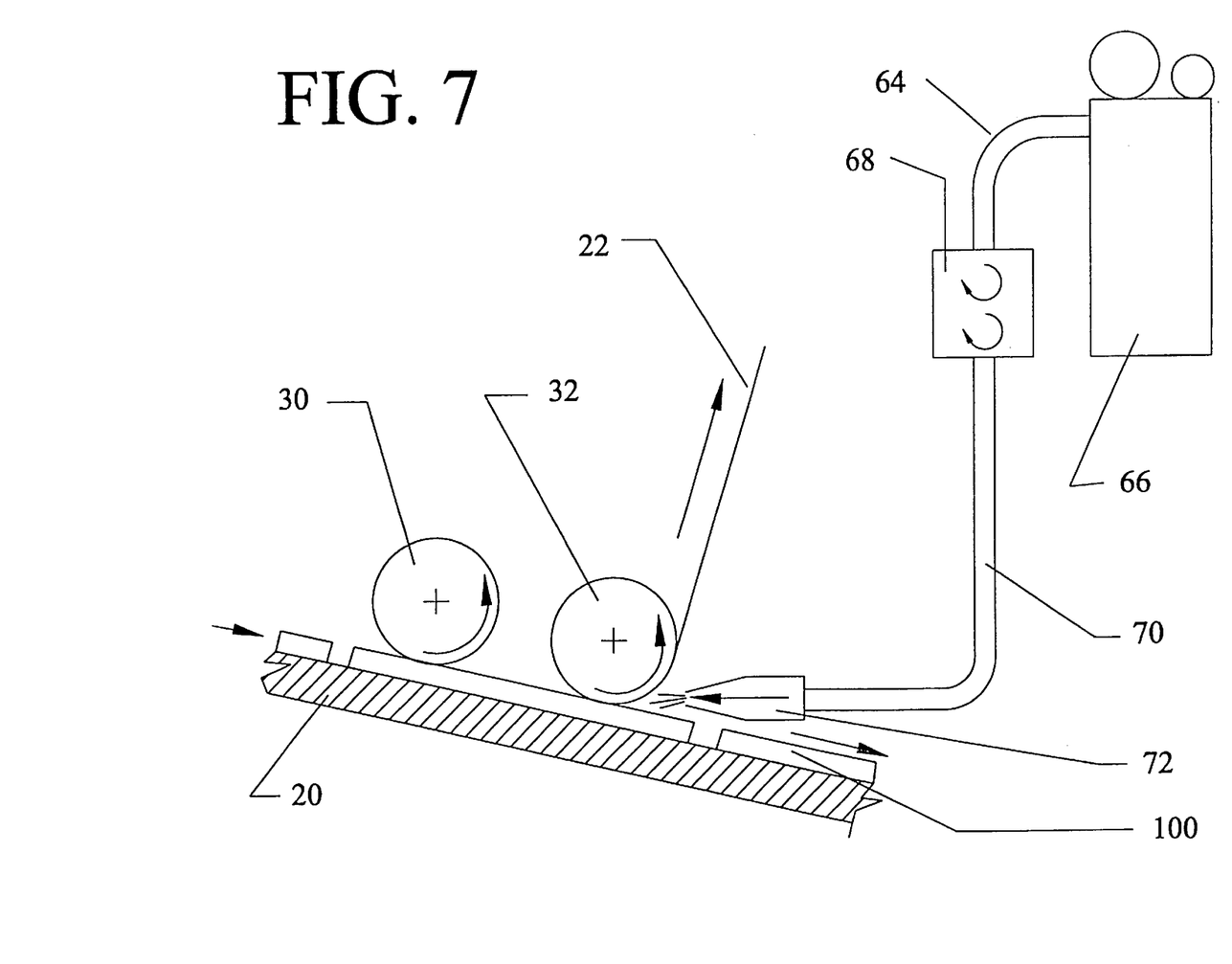
FIG. 7 is a sectional side view of a portion of an apparatus for removing labels from computer diskettes shown with a label cooling apparatus according to an embodiment of the present invention.
Figure 8:
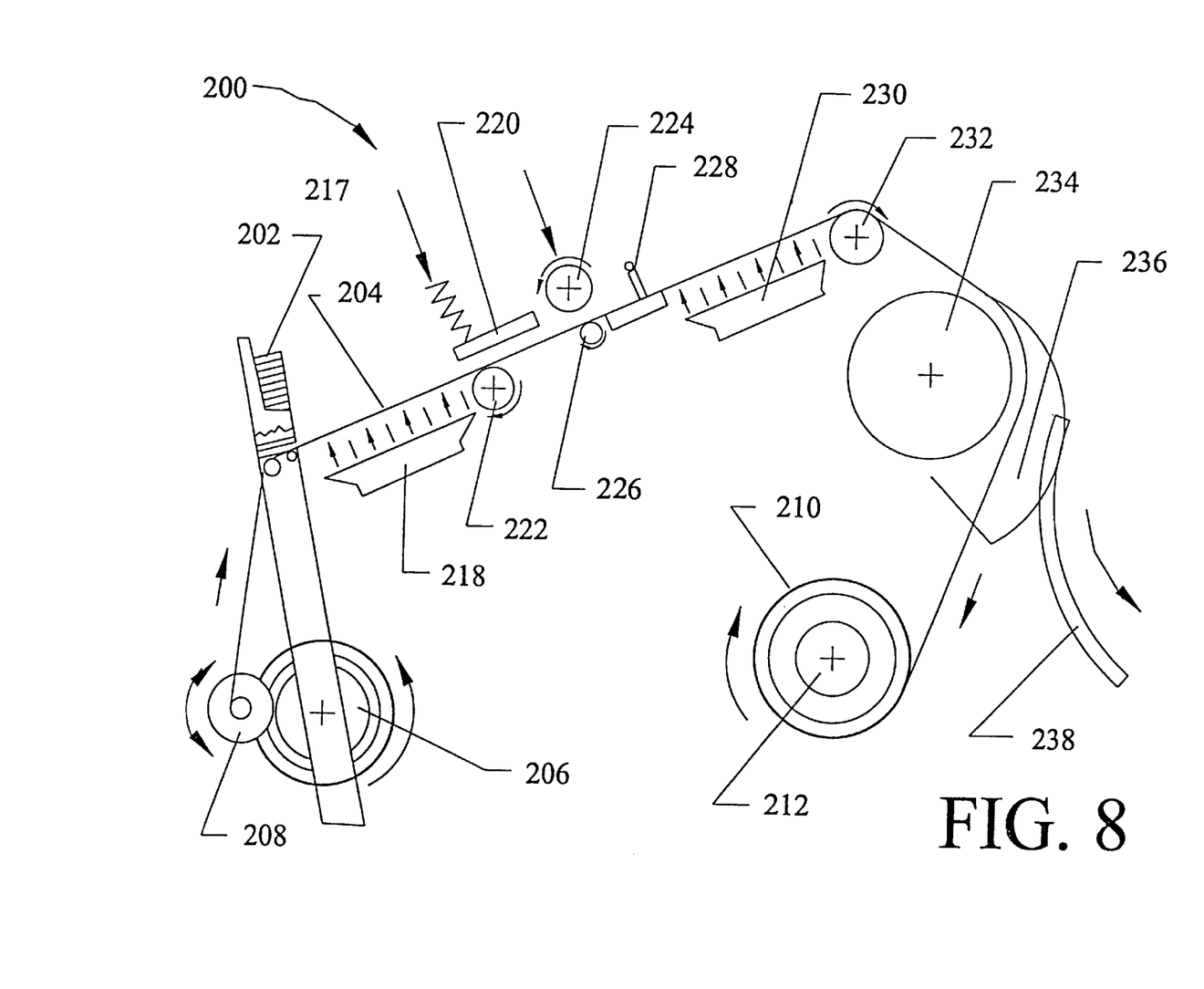
FIG. 8 is a side view in elevation of an apparatus for removing labels from computer diskettes according to an alternative embodiment of the present invention.

A label cooling device 64 for cooling the label 100 as it is peeled from the face of the diskette is shown in FIG. 7. The label cooling device includes an air compressor or air blower 66 connected to an air cooler 68. Cooled air is blown out of the cooler through pipe 70 and is ejected from a nozzle or air knife 72 at the base of the stripping roller 32 as the label 102 is peeled from the diskette 100. The air blown from the cooling device is preferably cooled to approximately 20° F. below the ambient temperature. This cooling helps bring the wafer quickly back to room temperature for subsequent handling.

An alternative embodiment of an apparatus 200 for removing labels from computer diskettes is shown in FIGS. 8–15. The apparatus according to this alternative embodiment includes a diskette supply hopper 202 for sequentially feeding a plurality of diskettes 100 onto a moving tape 204. The tape 204 is fed from a tape supply reel 206 by a DC motor 208, and passes beneath the hopper 202 with the adhesive side of the tape facing upward. The diskettes 100 are fed onto the tape 204 from the hopper 202 with the front portion of the label 102a facing upward such that the wraparound portion of the adhesive label 102c comes into contact with the upwardly facing adhesive side of the tape 204. A second DC motor 210 is connected to a tape take-up reel 212 about which the tape containing removed labels 102 is wound.

Figures 9, 16:
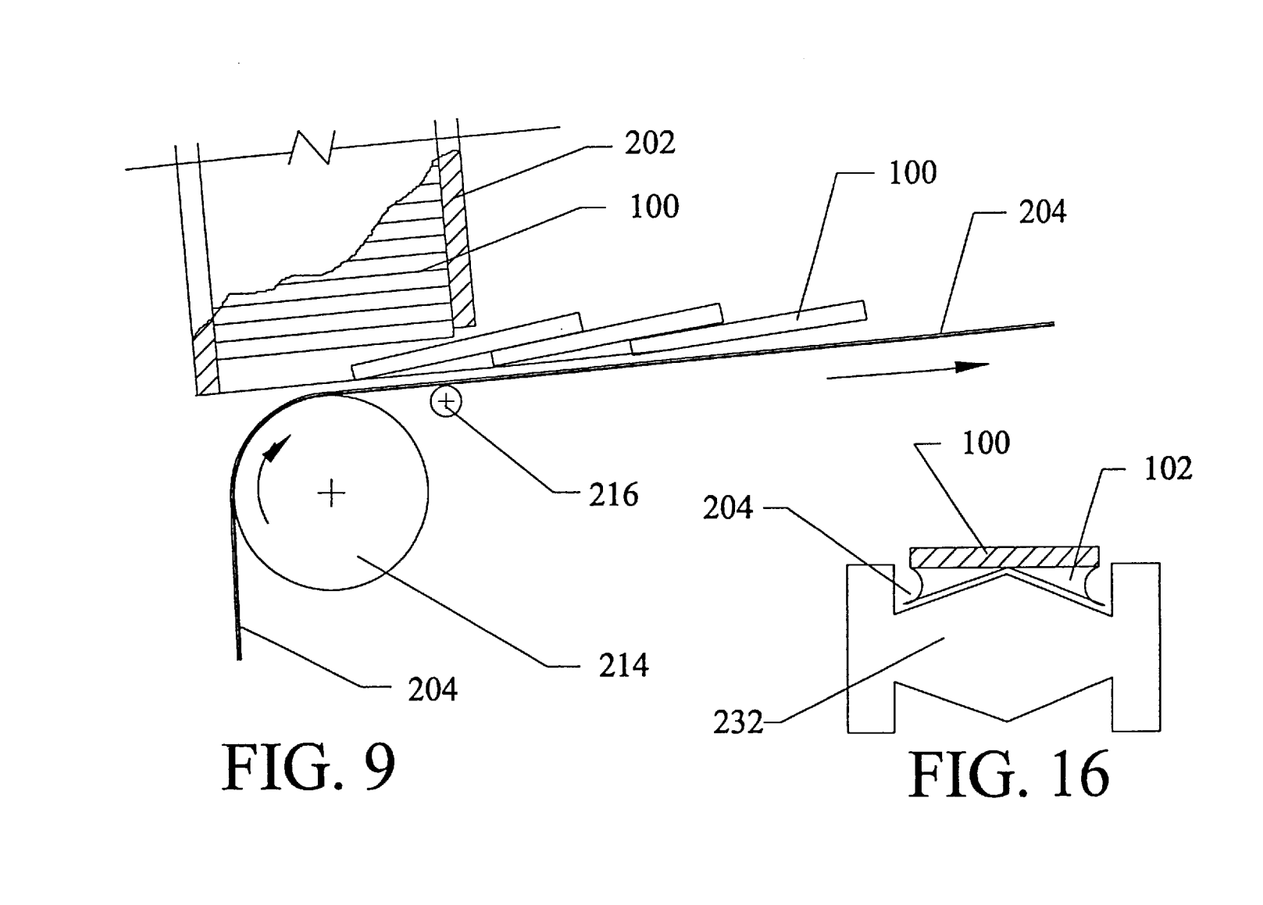
FIG. 9 is an enlarged sectional view of the hopper feed portion of the apparatus of FIG. 8, shown with the supporting structure removed for clarity.
FIG. 16 is an enlarged view of the divider roller of the apparatus shown in FIG. 8.

As best shown in FIG. 9, the diskettes 100 are individually fed from the hopper onto the tape 204 by a feed roller 214. The diskettes leave the hopper attached to the tape in an overlapping configuration. A guide roller 216 controls the degree of diskette overlap by it positioning in relation to the feed roller 214. The overlapping diskettes are carried by the tape 204 from the hopper to the compression stage 217 shown in FIG. 10. As the diskettes travel from the hopper to the compression stage, heat may be applied to the tape 204 and back label portion 102c by a radiant heater 218 positioned below the tape carrying the diskettes. The diskettes, labels and tape are heated to a temperature of between about 80° F. and 135° F. to soften the label adhesive. Although a radiant heater is shown, any type of heating apparatus may be used to bring the surface temperature within the desired range.

Figures 10, 11, 12, 13:
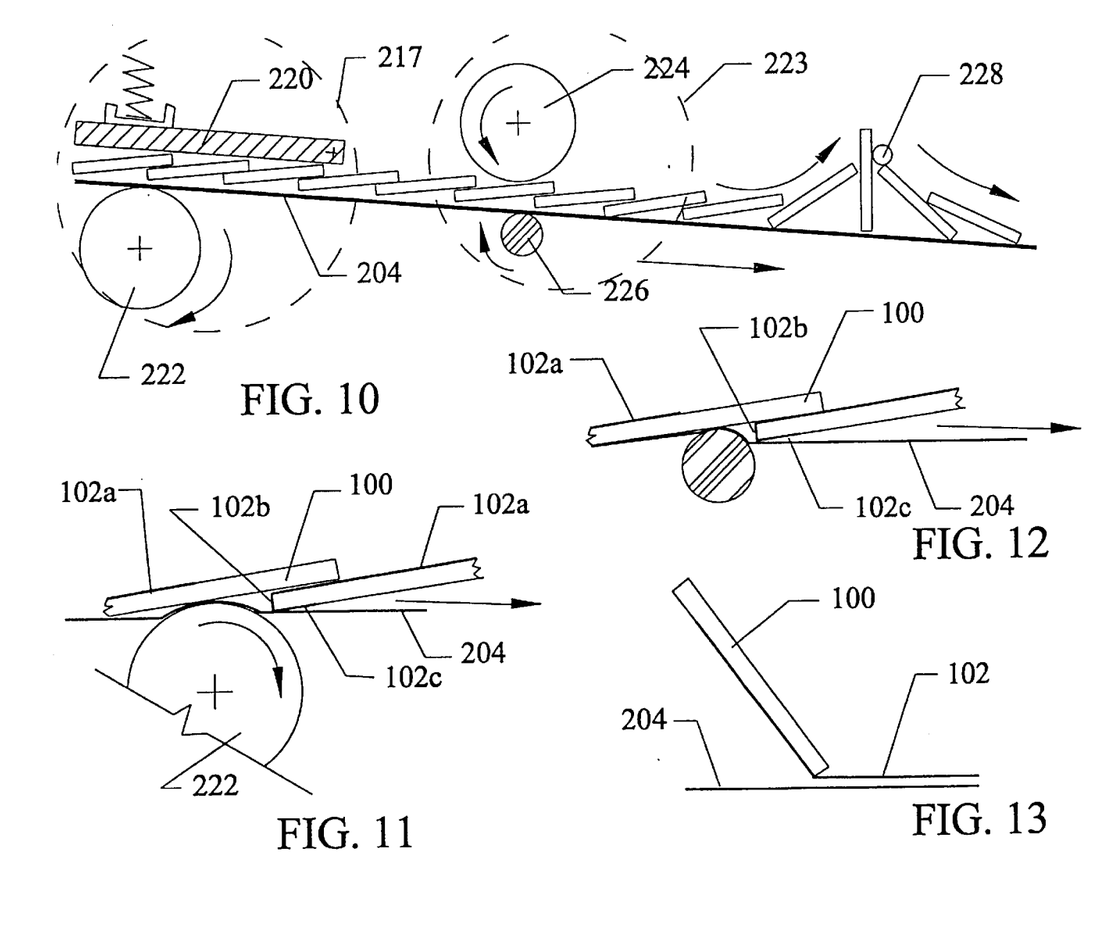
FIG. 10 is an enlarged sectional view of the front label peeling portion of the apparatus of FIG. 8, shown with the supporting structure removed for clarity.
FIG. 11 is an enlarged sectional view of a portion of the apparatus shown in FIG. 10.
FIG. 12 is an enlarged sectional view of a portion of the apparatus shown in FIG. 10.
FIG. 13 is an enlarged sectional view of a portion of the apparatus shown in FIG. 10.

At the compression stage 217, a pressure plate 220 exerts a substantially constant downward force on the top surfaces of the diskettes, while a roller 222 beneath the tape presses the adhesive side of the tape 204 against the back label section 102c, causing the tape to adhere to the back section of the label. From the compression stage, the diskettes travel to a second compression stage 223, where the diskettes pass between a pressure roller 224 located above the tape carrying the diskettes and a shaft 226 located directly beneath the tape. As shown in FIG. 12, the roller 224 presses the diskettes down such that the spine section of the label 102b is pressed against the shaft 226 thereby adhering the tape 204 to the label spine section 102b.

From the second compression stage 223, the diskettes are carried by the tape to a shaft 228 which raises each diskette up onto its spine and flips the diskette so that the upper surface bearing the upper section of the label 102a is in contact with the adhesive surface of the tape 204. The first diskette to reach the shaft 228 must be manually raised to bring it in contact with the shaft. Thereafter, each diskette is raised up onto its spine by the preceding diskette as shown in FIG. 10. As a diskette travels toward the shaft 228, it is gradually raised toward the shaft by contact with the preceding diskette, while the back label section 102c is being peeled from the back of the diskette. Once the leading edge of the diskette comes into contact with the shaft 228, the trailing edge continues along its path until the diskette is brought into a vertical position with the spine at the lower end in contact with the tape. The trailing edge of the diskette then becomes the leading edge as it continues to travel along its path and the diskette is flipped over such that the top side now faces down. As the diskette is flipped, the label 102 is peeled from the spine of the diskette, as best shown in FIG. 13.

After diskettes pass the shaft 228, they are turned over such that the front label portion 102a faces down and comes into contact with the upper adhesive surface of the tape 204. The front surfaces of the diskettes are then heated by a second radiant heater 230 positioned below the tape 204 between the shaft 228 and a divider roller 232. As each diskette passes over the divider roller 232, the front label section 102a begins to be peeled from the diskette. As shown in FIG. 16, the divider roller has a large diameter at the center and tapers to a smaller diameter near the edges. This tapered configuration causes the tape 204 to peel the label 102 beginning from the two corners of the leading edge, which places less strain on the diskette.

Figures 14A, 14B, 14C, 15:
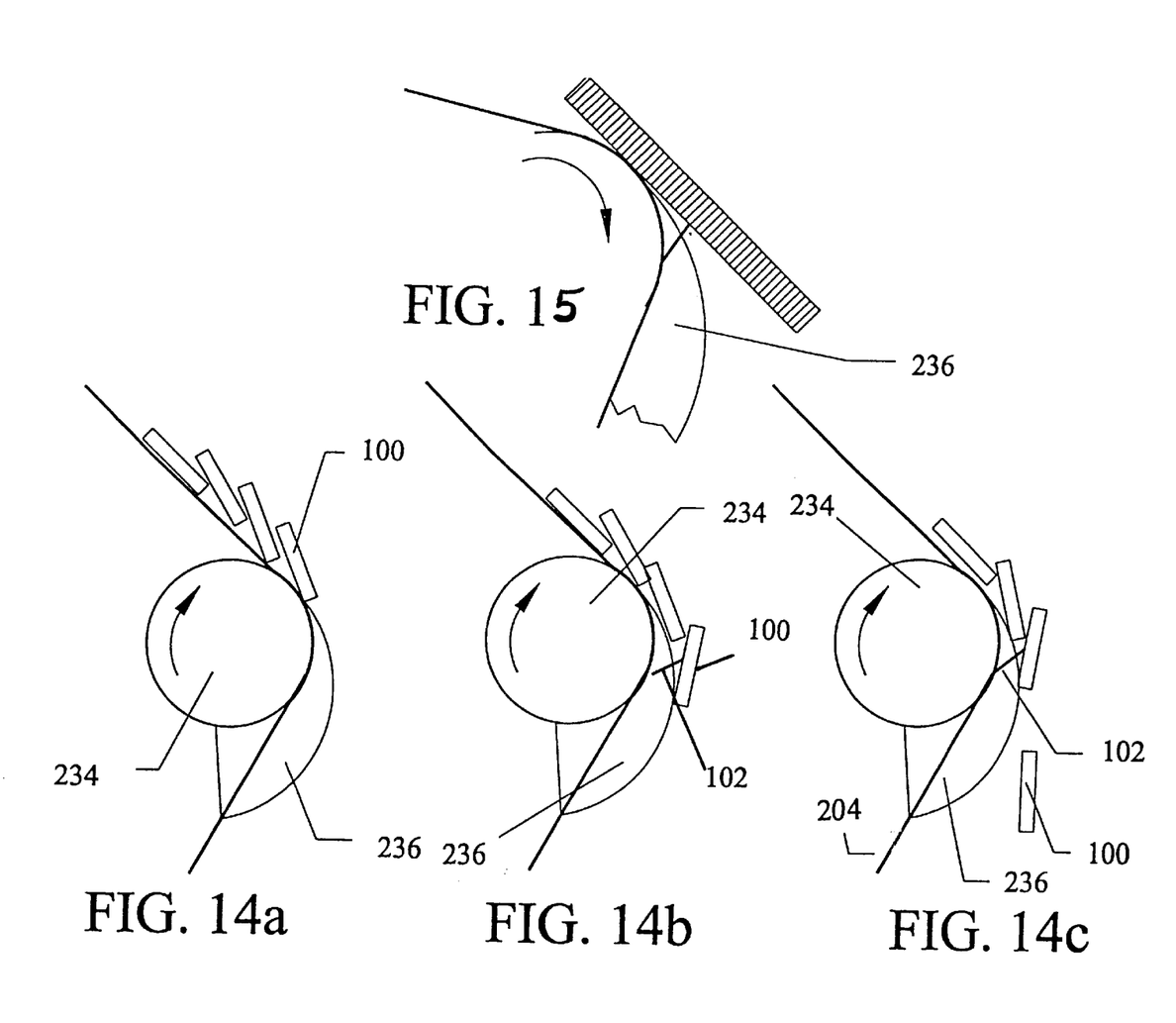
FIGS. 14A–14C show the sequential steps for removing a label from the spine and back of a diskette using the apparatus of FIG. 8.
FIG. 15 is an enlarged view of spine and back label peeling portion of the apparatus shown in FIGS. 14A–14C.

The diskettes then travel to an unlabeling roller 234 which sequentially guides the diskette into an unlabeling slide 236 where the labels 102 are completely removed from the diskette. FIG. 14A shows a diskette 100 as it comes into contact with the unlabeling slide 236. As the diskette 100 travels along the slide 236, the label 102 is peeled from the diskette as shown in FIG. 14B. Once the label has been removed from the diskette, the diskette 100 falls from the unlabeling slide 236, as shown in FIG. 14C, and enters a discharge slide 238, which discharges the unlabeled diskette from the system. The removed labels adhere to the adhesive surface of the tape 204 and are wound about the take-up reel 210 for disposal.

The present invention, therefore, is well adapted to carry out the objects and attain the ends and advantages mentioned as well as others inherent therein. While presently preferred embodiments of the invention are given for the purpose of disclosure, numerous changes in the details will readily suggest themselves to those skilled in the art and which are encompassed within the spirit of the invention and the scope of the appended claims.

We claim:

1. An apparatus for removing adhesive labels from computer diskettes comprising:

diskette supply means for feeding a diskette having an adhesive label adhered to at least one side thereof;

label removal means for peeling said adhesive label from the diskette, wherein said label removal means comprises:

a length of tape having an adhesive coating on an underside thereof;

a tape supply reel about which said length of tape is wound;

pressure means for applying a portion of an adhesive side of the length of tape from the supply reel to the diskette adhesive label at said attachment area;

label peeling means for separating the diskette adhesive label carried on the adhesive side of the length of tape from the diskette at said separation area, wherein said label peeling means comprises:

a second rotatable pressure roller contacting an upper surface of the length of tape at a point near the separation area;

stripping roller also contacting an upper surface of the length of tape at the separation area, said length of tape wrapping around at least a portion of said stripping roller and connecting to the take up roll located above the stripping roller; and tension means for applying a predetermined pressure to the length of tape by the second rotatable pressure roller and the stripping roller; and a tape take up reel for receiving said length of tape and the removed adhesive diskette labels; and diskette motive means for driving the diskette from an attachment area where said label removal means is adhered to the diskette adhesive label to a separation area where said diskette label is peeled from the diskette by said label removal means.

2. The apparatus for removing adhesive labels from computer diskettes according to claim 1, wherein said diskette supply means comprises a supply hopper for storing a plurality of diskettes and diskette feed means for sequentially feeding said diskettes from said supply hopper to said label removal means.

3. The apparatus for removing adhesive labels from computer diskettes according to claim 1, wherein said pressure means comprises a first rotatable pressure roller contacting an upper surface of the length of tape for urging the length of tape into adhesive contact with the diskette label.

4. The apparatus for removing adhesive labels from computer diskettes according to claim 1, wherein said tension means comprises:

a tension bar pivotally connected near a midpoint thereof to a frame of the apparatus for removing adhesive labels, a lower end of said tension bar connected to both said second rotatable pressure roller and said stripping roller; and a tension spring having a first end connected to an upper end of said tension bar and a second end connected to a fixed object.

5. The apparatus for removing adhesive labels from computer diskettes according to claim 1, wherein said label peeling means further comprises wraparound label removal means for removing the diskette label from a spine and a back side of the diskette.

6. The apparatus for removing adhesive labels from computer diskettes according to claim 5, wherein said wraparound label removal means comprises:

a spring loaded break mechanism for holding a forward end of the diskette to a guide track as the rear end of the diskette passes under the stripping roller;

a label spine and back removal mechanism comprising a shaft disposed along the upper surface of the length of tape between the stripping roller and the take up roll, and a stop located adjacent to the shaft for holding the diskette in place as the label is removed from the spine and back of the diskette; and a diskette track for receiving the unlabeled diskette from the label spine and back removal mechanism and discharging the unlabeled diskette from the apparatus.

7. The apparatus for removing adhesive labels from computer diskettes according to claim 6, wherein said wraparound label removal means further comprises air cooling means for cooling the adhesive label attached to the spine and back of the diskette as the diskette and label are carried from the stripping roller to the label spine and back removal mechanism.

8. The apparatus for removing adhesive labels from computer diskettes according to claim 1, wherein said diskette motive means comprises a motor for rotatably driving said take up reel such that the length of tape drives the diskette from the attachment area to the separation area and the length of tape carrying the removed diskette adhesive label is wound about the take up reel.

9. The apparatus for removing adhesive labels from computer diskettes according to claim 8, further comprising a gear belt for connecting the drive motor to and providing rotary motion to the take up reel.

10. The apparatus for removing adhesive labels from computer diskettes according to claim 1, wherein said pressure means comprises:

a roller contacting a non-adhesive side of the tape opposite the adhesive side upon which the diskettes are carried; and a pressure plate located opposite the contacting roller for applying pressure on the diskettes against the tape and contacting roller.

11. The apparatus for removing adhesive labels from computer diskettes according to claim 10, wherein said label peeling means comprises:

shaft means for turning the diskette from a position where an upper surface of the diskette faces upwardly to a position where the upper diskette surface faces downwardly and contacts the adhesive surface of the tape while simultaneously peeling the label from the spine and back of the diskette; and a label peeling slide for removing the label from the front surface of the diskette.

12. The apparatus for removing adhesive labels from computer diskettes according to claim 11, wherein said label peeling means further comprises a divider roller for peeling a portion of the front portion of the label from the front and lateral edges of the diskette; said divider roller located along the tape between said shaft means and said label peeling slide.

13. The apparatus for removing adhesive labels from computer diskettes according to claim 1, further comprising guide means for guiding said diskette and said label removal means from said attachment area to said separation area.

14. The apparatus for removing adhesive labels from computer diskettes according to claim 13, wherein said guide means comprises a track for slidably receiving a plurality of diskettes therein, said track having a first end for receiving diskettes from said diskette supply means and a second end wherein diskettes are discharged after the labels are removed.

15. The apparatus for removing adhesive labels from computer diskettes according to claim 14, wherein said track exhibits guide walls along the lateral sides thereof for guiding the diskettes within the track.

16. An apparatus for removing adhesive labels from computer diskettes comprising:

diskette supply means for feeding a diskette having an adhesive label adhered to at least one side thereof;

label removal means for peeling said adhesive label from the diskette;

diskette motive means for driving the diskette from an attachment area where said label removal means is adhered to the diskette adhesive label to a separation area where said diskette label is peeled from the diskette by said label removal means; and heating means for applying heat to the label removal means and diskette label between said attachment area and said separation area.

17. The apparatus for removing adhesive labels from computer diskettes according to claim 16, wherein said heating means is an electric radiant heater located a predetermined distance above the length of tape between the attachment area and the separation area.

18. The apparatus for removing adhesive labels from computer diskettes to claim 16, further comprising cooling means for applying cooled air to the length of tape and diskette label adjacent said label removal means.

19. An apparatus for removing adhesive labels from computer diskettes comprising:

diskette supply means for feeding a diskette having an adhesive label adhered to at least one side thereof;

label removal means for peeling said adhesive label from the diskette;

diskette motive means for driving the diskette from an attachment area where said label removal means is adhered to the diskette adhesive label to a separation area where said diskette label is peeled from the diskette by said label removal means; and cooling means for applying cooled air to the label removal means and diskette label adjacent said label removal means.

20. The apparatus for removing adhesive labels from computer diskettes according to claim 19, wherein said cooling means includes a blower and a cooler connected to a nozzle which ejects the cooled air adjacent said label removal means.

21. An apparatus for removing adhesive labels from computer diskettes comprising:

a supply hopper for storing a plurality of diskettes, each diskette having an adhesive label adhered to at least one side thereof;

a guide track for slidably receiving said plurality of diskettes, said guide track having a first end for receiving diskettes from the supply hopper and a second end wherein diskettes are discharged after the labels are removed;

a hopper feed motor for sequentially feeding said plurality of diskettes to said guide track;

a length of tape having an adhesive coating on an underside thereof;

a tape supply reel about which said length of tape is wound;

a first rotatable pressure roller for applying a portion of the length of tape from the supply reel to the diskette adhesive label at an attachment area along the guide track;

a second rotatable pressure roller and a stripping roller for separating the length of tape carrying the diskette adhesive label from the diskette at a separation area along the guide track;

a tension bar pivotally connected near a midpoint thereof to a frame of the apparatus for removing adhesive labels, a lower end of said tension bar connected to both said second rotatable pressure roller and said stripping roller;

a tension spring having a first end connected to an upper end of said tension bar and a second end connected to a fixed object;

a tape take up reel for receiving said length of tape and the removed adhesive diskette labels; and a motor for rotatably driving said take up reel such that the length of tape drives the diskette from the attachment area to the separation area and the length of tape carrying the removed diskette adhesive label is wound about the take up reel.

22. An apparatus for removing adhesive labels from computer diskettes comprising:

a supply hopper for storing a plurality of diskettes, each diskette having an adhesive label adhered to at least one side thereof;

a tape supply reel;

a tape take up reel;

a length of tape having an adhesive surface on an upperside thereof and a first end connected to said tape supply reel and a second end connected to said tape take up reel;

a hopper feed roller for sequentially feeding said plurality of diskettes onto said upper adhesive surface of the length of tape;

means for controlling the feed rate of diskettes onto said length of tape;

a pressure plate located above the length of tape and a corresponding roller located opposite the pressure plate below the length of tape for applying a portion of the length of tape to a backside of the diskette adhesive label;

a pressure roller located above the length of tape and a corresponding shaft located opposite the pressure roller below the length of tape for applying a portion of the length of tape to a spine of the diskette adhesive label;

means for removing the spine and back portions of the label from the diskette;

an unlabeling slide for removing the front portion of the label from the diskette; and a motor for rotatably driving said take up reel such that the length of tape drives the diskette along the apparatus.

23. A process for removing adhesive labels from computer diskettes comprising the steps of:

sequentially supplying a plurality of diskettes, each having an adhesive label adhered to at least one side thereof, to a diskette guide track;

applying a length of tape received from a tape supply reel to the diskette label at an attachment area along the diskette guide track;

applying heat to the length of tape;

moving the diskette, diskette label and length of tape along the guide track by motive power means attached to the length of tape;

peeling the diskette label from the diskette at a separation area along the guide track, such that said diskette label remains attached to the length of tape;

wrapping the length of tape carrying the removed diskette labels about a take up reel; and discharging a non-labeled diskette from the guide track.

24. The process for removing adhesive labels from computer diskettes according to claim 23, wherein the step of peeling the diskette label from the diskette further comprises removing the diskette label from a spine and a back of the diskette.

25. The process for removing adhesive labels from computer diskettes according to claim 24, wherein the step of removing the diskette label from the spine and back of the diskette comprises the steps of:

holding a forward end of the diskette to the guide track as the rear end of the diskette passes under the stripping roller;

carrying the diskette and label by the spine from the stripping roller to a label spine and back removal mechanism; and holding the diskette in place while the label is removed from the spine and back of the diskette.

26. The process for removing adhesive labels from computer diskettes according to claim 25, wherein the step of removing the diskette label from the spine and back of the diskette further comprises the step of air cooling the label attached to the spine and back of the diskette as the diskette and label are carried from the stripping roller to the label spine and back removal mechanism.

27. A process for removing adhesive labels from computer diskettes comprising the steps of:

sequentially supplying a plurality of diskettes, each having an adhesive label thereon, to an upper adhesive surface of length of tape;

moving the diskette, diskette label and length of tape by motive power means attached to the length of tape;

applying pressure to the diskette and tape to adhere the upper adhesive surface of the tape to the diskette label;

peeling the label from a back and a spine of the diskette;

rotating the diskette such that a front portion of the label contacts the upper adhesive surface of the tape; and removing the front portion of the label from the diskette such that said diskette label remains attached to the length of tape;

wrapping the length of tape carrying the removed diskette labels about a take up reel; and discharging a non-labeled diskette from the apparatus.

28. The process for removing adhesive labels from computer diskettes according to claim 27, wherein the step of applying pressure to the diskette and tape comprises the steps of:

applying pressure to the diskette and tape to adhere the upper adhesive surface of the tape to a back portion of the diskette label;

applying pressure to the diskette and tape to adhere the upper adhesive surface of the tape to a spine portion of the diskette label.

29. The process for removing adhesive labels from computer diskettes according to claim 27, further comprising the step of heating said tape, said label and a lower surface of said diskette prior to the step of applying pressure to the diskette and tape.

30. The process for removing adhesive labels from computer diskettes according to claim 29, further comprising the step of heating said tape, said front portion of the label and a lower surface of said diskette prior to the step of removing the front portion of the label from the diskette.

* * * * *